Aug. 12, 1952 — R. G. BRUNER — 2,606,416
PICKUP FOR HARVESTERS
Filed Oct. 4, 1947 — 2 SHEETS—SHEET 2
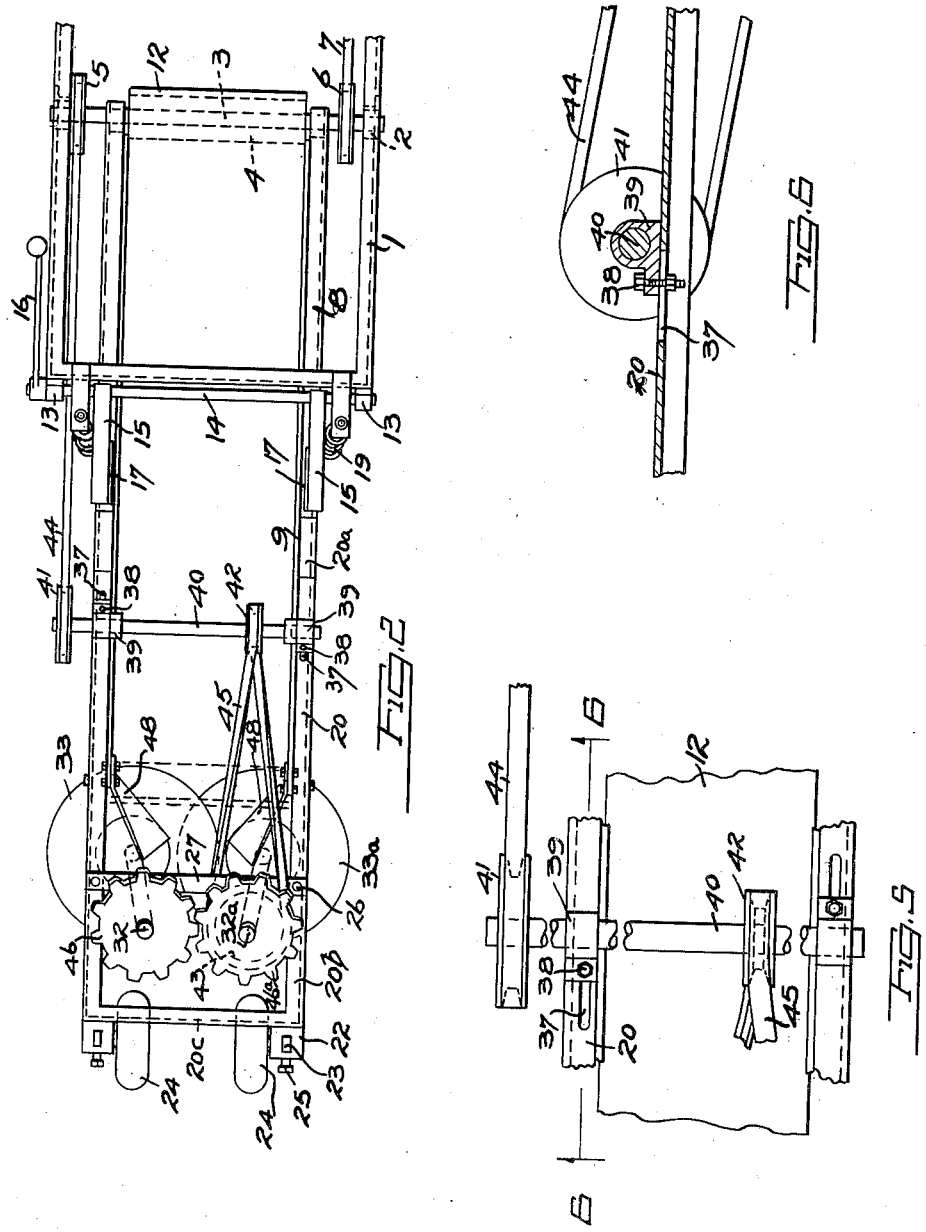
INVENTOR.
Reuben G. Bruner
BY
Attorney.

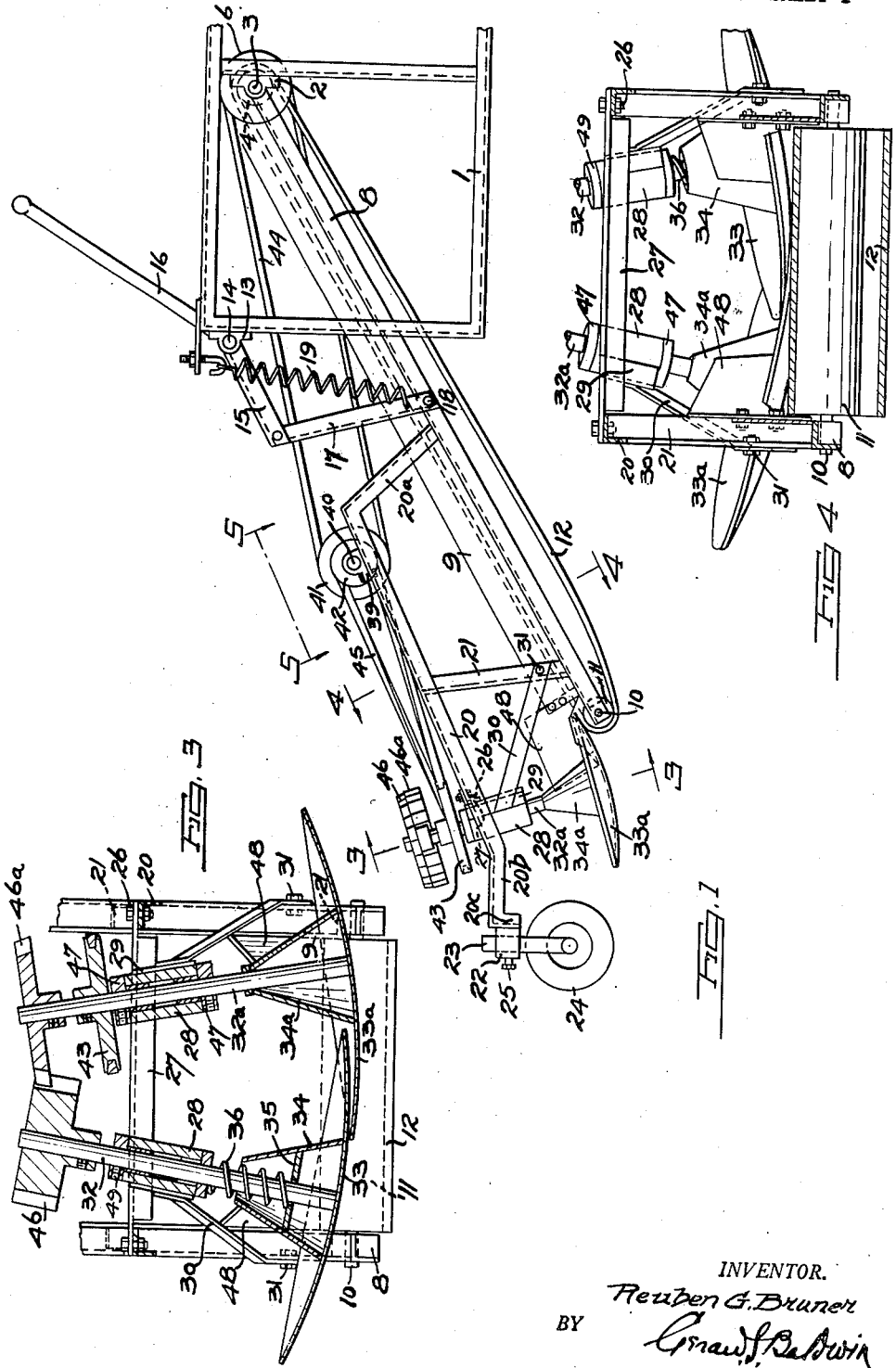

Patented Aug. 12, 1952

2,606,416

UNITED STATES PATENT OFFICE 2,606,416

PICKUP FOR HARVESTERS

Reuben G. Bruner, Ferndale, Mich.

Application October 4, 1947, Serial No. 777,883

2 Claims. (Cl. 55—106)

This invention relates to pick-ups for harvesters and refers particularly to pick-ups intended for harvesting onions and kindred produce.

It is an object of the invention to provide a pick-up for harvesters including two rotary discs arranged in partially overlapping relation for picking up onions and depositing them upon a conveyor, wherein the discs are normally in contact with one another, and wherein means are provided for permitting one disc to move axially away from the other to prevent clogging, so that if sticks or other material enters between the discs the latter will not become jammed and cease to turn.

Another object of the invention is to provide a pick-up for harvesters wherein the shaft for one of the discs is driven from the harvester and the shaft for the second disc is driven by the first named shaft in such a manner that the shaft for the second disc and the disc itself may readily move axially from the disc on the first shaft to prevent the clogging and jamming above referred to.

A further object of the invention is to provide a pick-up for harvesters including an angularly adjustable countershaft so that the latter may be readily adjusted from time to time to obtain the required tension both on a belt extending between a driving means and the countershaft and upon a belt between the countershaft and the shaft on which one of the discs is mounted.

Another object of the invention is to provide a pick-up for harvesters including a cone mounted upon each disc and around the shaft extending therefrom to assist in delivering onions onto a conveyor.

Having thus briefly and broadly stated some of the objects and advantages of the invention I will now describe it in detail with the aid of the accompanying drawings, in which:

Figure 1 is a side elevation showing the pickup and a portion of a harvester on which it is mounted, and Figure 2 is a plan view thereof.

Figures 3 and 4 are enlarged sections on the lines 3—3 and 4—4 respectively of Figure 1.

Figure 5 is an enlarged detail taken on the line 5—5 of Figure 1, and

Figure 6 is a section on the line 6—6 of Figure 5.

Referring to the drawings, 1 designates a portion of the frame of a harvesting machine having bearings 2 thereon which support a transverse horizontal shaft 3 for rotation. Fixed around the shaft 3 are a pulley 5, a roller 4 and another pulley 6 having a belt 7 around it which is driven by another pulley (not shown) upon the harvester. Mounted around the shaft 3 which extends through the rear extremity of each of them are angle members 8 having guide plates 9 secured to their inner edges. Extending through the front extremities of the angle members 8 and rotatably supported thereby is a shaft 10 parallel with the shaft 3 and having a roller 11 mounted thereon, and extending around the rollers 4 and 10 is an endless conveyor belt 12 of any suitable construction. Mounted on the frame 1 are other bearings 13 which support a shaft 14 parallel with the shaft 3. Fixed on the shaft 14 for rotation therewith are arms 15 and an operating handle 16. Pivoted on the outer extremities of the arms 15 are links 17 which are also pivoted at 18 to the angle members 8, so that by turning the handle 16 in one direction the angle members 8 are moved about the axis of the shaft 3 to raise the front extremity of the said angle members and the guides 9 and other parts carried thereby. 19 denotes helical springs each secured at one extremity to the frame 1 and at its other extremity to one of the pivot members 17.

Extending substantially parallel with and above the front extremities of the angle members 8 are frame extensions 20 the rear portions of which are rearwardly and downwardly inclined at 20a and are secured at their lower extremities to the said members 8. The front extremities 20b of the frame extensions are offset so that they are normally substantially horizontal and are connected across the front by a cross member 20c. Braces 21 are secured at their lower extremities to the angle member 8 and at their upper extremities to the frame extensions 20 intermediately of their length to stiffen the latter. Secured to the cross member 20c are vertically apertured blocks 22 to receive arms 23 each of which supports a wheel 24 for rotation. The arms 23 are held immovable in the blocks 22 by set screws 25.

Extending between the frame extensions 20 and secured as by bolts 26 thereto is a cross member 27. 28 denotes two spaced bearings having integral flanges 29 which are secured to the cross member 26. Secured also to the flanges 29 are the upper extremities of straps 30 the lower ends of which are secured to the braces 21 as by bolts 31. Thus by removing the bolts 26 and 31 the cross member 27, the bearings 28 and the straps 30 may be easily removed.

Mounted for rotation in the bearings 28 are shafts 32 and 32a having discs 33 and 33a respectively secured on their lower extremities. These discs are slightly dished and present concave faces toward their respective shafts and are arranged in overlapping relation the disc 33 being above and quite close to but not in actual contact with the disc 33a beneath it. It will also be noted that the bearings 28 are so positioned that the shafts 32 and 32a are somewhat upwardly and inwardly inclined toward one another transversely of the machine, and also so that these shafts are somewhat forwardly and upwardly inclined and in transverse alignment longitudinally of the machine. Mounted around the shafts 32 and 32a are hollow cones 34 and 34a secured at their lower extremities to the discs 33 and 33a respectively. Secured to the inner periphery of the cone 34 intermediately of its height is an annular flange 35 through which the shaft 32 projects. Extending around the shaft 32 between the flange 35 and the underside of the bearing 28 above it is a helical spring 36 which tends to retain the disc 33 in close proximity to the disc 33a and also permits upward movement of the disc 33 and the shaft 32 against the tension of the spring to permit discharge of sticks and other matter caught between the discs. The collar 49 on the shaft 32 limits the downward axial movement of the latter and prevents actual contact of the discs 33 and 33a with one another.

Formed through each frame extension 20 is a slotted aperture 37 through which a bolt 38 passes to hold a bearing thereupon, and supported for rotation in the bearings 39 is a shaft 40 having pulleys 41 and 42 fixed thereon. The pulley 41 is in substantial alignment with the pulley 5 and the pulley 42 is opposite a pulley 43 fixed on the shaft 32a. The pairs of pulleys 5 and 41, and 42 and 43 are connected by belts 44 and 45 respectively. Each bearing 39 is thus held by a single bolt 38 so that not only are these bearings longitudinally adjustable but slight misalignment of the shaft 40 is also obtainable. Since the belt 44 is relatively long and the pulleys 41 and 5 are flanged slight misalignment of the shaft 40 does not interfere with the drive, and the same thing applies also to the quarter turned belt 45. Thus by adjustment of the bearings 39 both belts may be easily kept taut without having to resort to more complicated forms of take-up.

Mounted on the shaft 32 is a gear 46 which meshes with a gear 46a on the driven shaft 32a on which the pulley 43 is secured; the gear 46 is wider than the gear 46a so that at all axial positions of the shaft 32 in its bearings 33 the gears remain in mesh, it being understood of course that the shaft 32a is held against axial movement as by collars 47.

Secured to the inner face of the guide plates 9 are forwardly and inwardly bent guards 48 which terminate adjacent the cones 34 and 34a respectively and direct the flow of produce onto the conveyor belt 12.

It is of course understood that the pick-up shown is very largely of welded construction and that the various parts such as the straps 30 are welded to the bearing flanges 29, and the braces 21 are similarly welded to the angle members 8 and to the front extension 20, though obviously other means may be employed for securing these parts to one another.

While in the foregoing the preferred embodiment of the invention has been described and shown it is understood that alterations and modifications may be made thereto provided the said alterations and modifications fall within the scope of the appended claims.

What I claim is:

1. A pick-up for vegetable harvesters including a frame having wheels thereon adapted to travel along the ground, an upwardly and rearwardly inclined conveyor mounted on the frame, substantially vertical shafts mounted for rotation one toward each side of the frame forwardly of the conveyor, said shafts being substantially in transverse alignment, one of the shafts being also mounted for limited upward movement away from said conveyor, each shaft extending downwardly and somewhat rearwardly, a disc fixed on the lower extremity of each shaft, the adjacent margins of the two discs being in overlapping relation and the rear portions of said discs projecting over the front of the conveyor, the front margins of the discs being substantially at ground level to pick up vegetables thereon, means on one of the shafts for rotating the latter, coacting means on the shafts for turning one shaft in one direction when the other shaft is rotated in the opposite direction, guide members on said frame projecting over the discs for unloading the vegetables from said discs onto the conveyor, yielding means in engagement with and exerting downward pressure upon the upwardly movable shaft tending to retain the disc thereon in close proximity to the other disc, said yielding means permitting upward movement of the movable shaft and its disc to discharge clods, stones and the like caught between the discs, and annular members mounted around the shafts above the discs for retaining the vegetables on the outer portions of the said discs.

2. A pick-up for vegetable harvesters including a frame having wheels thereon adapted to travel along the ground, an upwardly and rearwardly inclined conveyor mounted on the frame, a bearing mounted toward each side of the frame forwardly of the conveyor, said bearings being substantially in transverse alignment and the axis of each of said bearings extending downwardly and somewhat rearwardly and outwardly, a shaft rotatably supported in each bearing, one of said shafts being mounted for limited upward movement away from said conveyor, a disc having its upper face slightly dished fixed on the lower extremity of each shaft, the inner margins of the discs being in overlapping relation and the rear portions of said discs projecting over the front of the conveyor, the front margins of the discs being substantially at ground level to pick up vegetables thereon, means on one of the shafts for rotating the latter, coacting means on the shafts for turning one of them in one direction when the other is rotated in the opposite direction, guide members on said frame projecting over the discs for unloading the vegetables from said discs onto the conveyor, a helical spring around the upwardly movable shaft extending between the bearing and the disc and tending to retain the latter in close proximity of the disc on the other shaft, said spring permitting movement of the disc on the movable shaft away from the other disc to allow discharge of stones, dirt and the like caught between the overlapping portions of said discs, and cones mounted around the discs to impart movement to vegetables lying against them and to prevent vegetables collecting immediately adjacent the shafts.

REUBEN G. BRUNER.

REFERENCES CITED

The following references are of record in the file of this patent:

UNITED STATES PATENTS

| Number | Name | Date |
|---|---|---|
| 1,021,228 | Ayers | Mar. 26, 1912 |
| 2,245,821 | Boynter | June 17, 1941 |
| 2,344,663 | Wood | Mar. 21, 1944 |

FOREIGN PATENTS

| Number | Country | Date |
|---|---|---|
| 369,743 | Germany | Feb. 22, 1923 |